June 30, 1970  R. S. COPE  3,517,591
AUTOMATED DRAFTING SYSTEM
Filed May 17, 1966  2 Sheets-Sheet 2
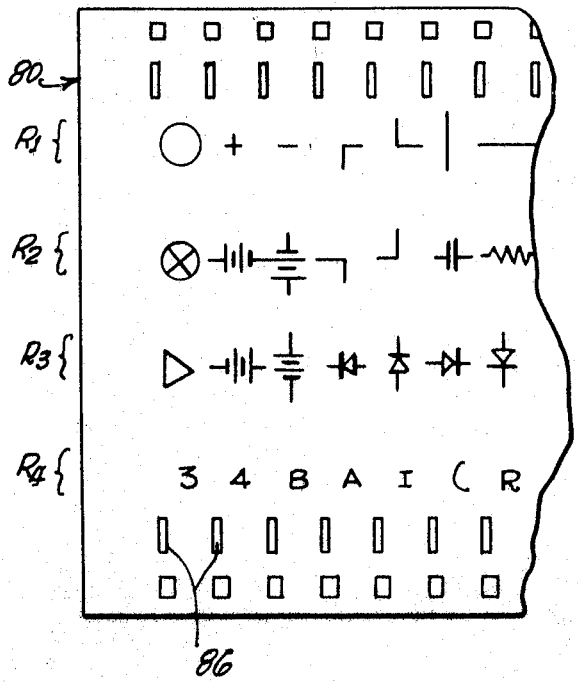
FIG. 3.
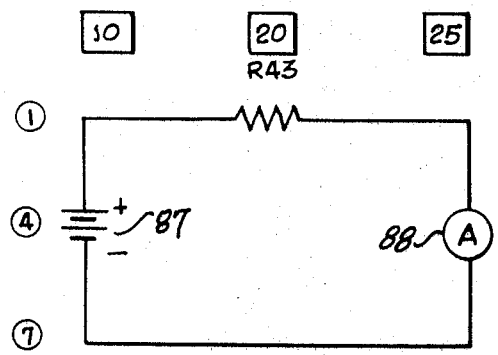
FIG. 5.
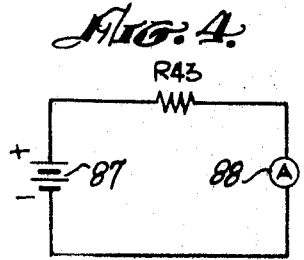
FIG. 4.
FIG. 6.
① μ [20] c R43 ®
① ∧ [10] c1 ∧ [25] c3 ∧ [20] RH ®
④ ∧ μ [10] R + ®
④ ∧ ⋏⋏⋏ [25] c A ®
④ ∧ [10] BA ∧ [25] c BCVB ®
④ ∧ ℓ [10] R ⊖ ®
⑦ ∧ [10] c2 ∧ [25] c 4 ®
INVENTOR.
ROBERT S. COPE,
BY HIS ATTORNEYS
Spensley & Horn __United States Patent Office__

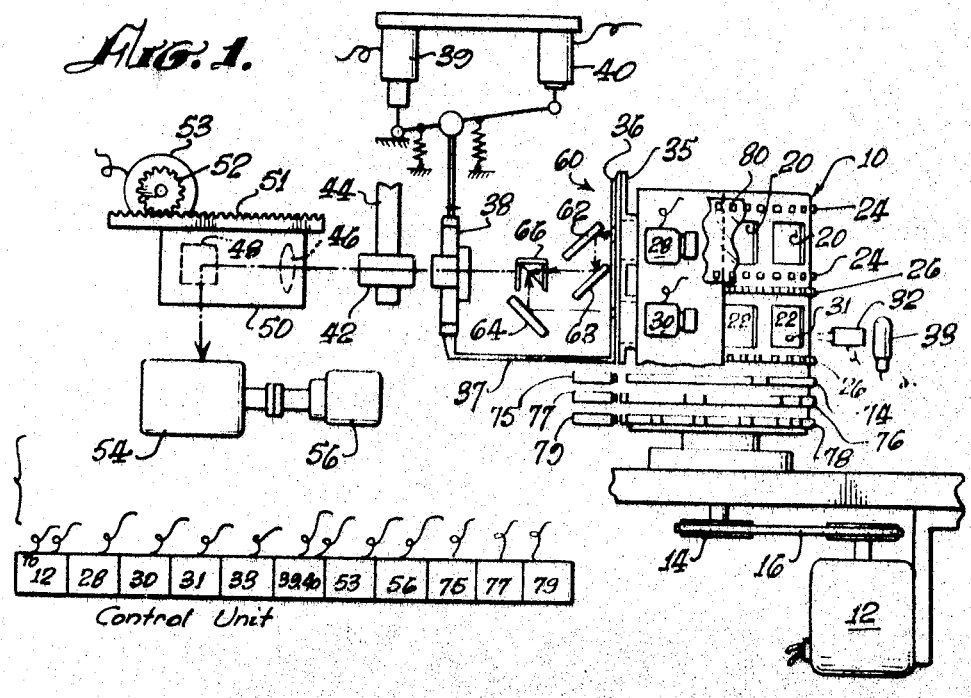

3,517,591
Patented June 30, 1970

3,517,591
AUTOMATED DRAFTING SYSTEM
Robert S. Cope, Covina, Calif., assignor to Cope
  Typesetting Service, Inc., Monterey Park, Calif., a
  corporation of California
Filed May 17, 1966, Ser. No. 550,755
Int. Cl. B41b 21/00
U.S. Cl. 95—4.5                                6 Claims

ABSTRACT OF THE DISCLOSURE

An automatic drafting system and method in which a keyboard operated tape perforator is used to produce a tape containing character identifying and locating data. A computer combines the data on the first tape with data identifying and locating the interconnecting lines, of the desired schematic, to produce a second tape. The second tape is used to operate an automatic phototypesetting apparatus.

---

This invention relates to an automated drafting system for preparing schematic drawings without the necessity of manual drafting.

The preparation of schematic drawings by manual drafting is a relatively tedious and time consuming operation, particularly in the preparation of electrical circuit diagrams. Hence, numerous attempts have been made to reduce the manual drafting effort required, with the ultimately desired but heretofore unattainable result being a complete elimination of the draftsman. Early attempts to increase the efficiency of the drafting process and improve drawing quality involved the use of templates for lettering and frequently used symbols. Later, decals were used to eliminate the drafting of nomenclature, components, and circuit portions. Manually operated machines were developed for the composition of lines and symbols directly or by photographic means. However, such machines, decals and templates have failed to provide a rapid and versatile enough drafting process for the quantity production of high quality drawings.

An attempt to automate the drafting process has resulted in the more recent development of so-called X–Y plotter equipment which can be computer controlled for the production of various types of drawings. The X–Y plotter is essentially a mechanized stylus moving in a Cartesian coordinate system in response to "X" and "Y" input signals. However, this automated drafting system is still relatively slow when used to prepare schematic drawings, primarily due to the fact that a stylus is used to draw the required lines as in a manual drafting system. An additional disadvantage of this type of system is the relatively large computer capacity and programming necessary to achieve sufficient system flexibility. Accordingly, this system is not suitable for quantity production requirements.

In order to be suitable for the quantity production of high quality drawings, an automated drafting system should have four especially desirable characteristics: (1) ease of input; (2) flexibility of output; (3) provision for drawing changes and revisions; and (4) high quality and high speed output. The present invention is directed toward an automated drafting system and apparatus possessing these desirable characteristics while obviating the aforementioned disadvantages of prior art devices.

Accordingly, it is an object of the present invention to provide an improved automated drafting system.

It is also an object of the present invention to provide an improved automated drafting process and apparatus.

It is another object of the present invention to provide an automated drafting system capable of the quantity production of high quality schematic drawings.

It is a further object of the present invention to provide an automated drafting system characterized by ease of data input.

It is yet another object of the present invention to provide a flexible automated drafting system.

It is a still further object of the present invention to provide an automated drafting system wherein drawing changes and revisions can be easily made.

It is also an object of the present invention to provide an automated drafting system capable of high speed output while maintaining high drawing quality.

Briefly, the present invention system utilizes a digital computer to reduce the input of variable and complex data to a simple code, the computer expanding and translating the data into a form usable for controlling automatic phototypesetting apparatus. The present invention process involves converting information identifying and locating the symbols and nomenclature comprising a desired schematic drawing into data coded in machine language, and controlling the operation of phototypesetting means for reproducing the symbols and nomenclature in accordance with the data to compose the schematic drawing. By providing the phototypesetting apparatus with a character matrix containing master characters comprising the symbols and characters of the drawing, as well as alphabetical and numerical characters, the phototypesetting apparatus can be controlled to produce the desired schematic drawing in accordance with the normal line-by-line mode of type composition.

The presently preferred embodiment of the automated drafting system comprises a keyboard tape perforator for preparation of a first control tape coded with basic drawing information, a digital computer equipped at its input with a tape reader and at its output with a tape perforator for the purpose of expanding and rearranging the data on the first tape to provide a second coded control tape, and automatic phototypesetting apparatus provided at its input with a tape reader, the second coded tape controlling operation of the automatic phototypesetting apparatus to compose the desired schematic drawing.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

In the drawings:

FIG. 1 is a partially schematic, elevation view of a typical automatic phototypesetting apparatus;

FIG. 2 is a partially schematic, plan view of the apparatus shown in FIG. 1;

FIG. 3 shows a portion of a matrix band;

FIG. 4 is a schematic drawing of a simple electrical circuit;

FIG. 5 shows the schematic drawing of FIG. 4 having line and space indicia thereon for positioning the drawing on a page;

FIG. 6 shows an illustrative code for controlling the apparatus of FIGS. 1 and 2 to automatically prepare the drawing of FIGS. 4 and 5; and FIG. 7 is a block diagram depicting the presently preferred embodiment of the automated drafting system.

The present invention technique is based upon the adaptation of high speed automatic phototypesetting equipment for the reproduction of the symbols and nomenclature used in schematic drawings, together with a computer control to thereby provide a completely automated drafting system. The phototypesetting apparatus can be of a commercially available type, with the presently preferred apparatus being that commonly known as the "Photon model 713" manufactured by Photon, Incorporated. This type of apparatus utilizes a rapidly revolving drum having a matrix comprising a plurality of apertures in which are mounted film strips containing master character images. A strobe light disposed within the drum is triggered by electrical control means at the exact instant when a desired master character image on the spinning drum is aligned with the shutter and lenses of an optical system. The strobe flash optically stops the desired image as its light beam is projected through the optical system onto a horizontally driven prism, movement of the prism being stopped in synchronism with flashing of the strobe light. A control circuit governs movement of the prism and advancement of the film so that composing is accomplished in a line-by-line manner, the control circuit also controlling operation of the strobe light to select the character to be recorded at a given position. The control circuit is operated from a coded tape, the control circuit being a digital system having a perforated paper tape reader, a memory storage device and a series of solid-state logic networks. Various circuits for controlling operation of automatic phototypesetting apparatus are known in the art and hence will not be discussed in detail beyond stating the various functions to be performed by such circuits.

In FIGS. 1 and 2 of the drawing there are shown schematic views depicting the basic structural element of the above-described type of automatic phototypesetting apparatus, this apparatus being generally indicated by the reference numeral 100 in the block diagram of FIG. 7. A drum 10 is rapidly rotated by a motor 12 by means of a pulley 14 and a belt 16. The drum has two circumferentially extending rows of apertures 20 and 22, and two sets of sprocket teeth 24 and 26 associated respectively with the aperture rows. The sprocket teeth are adapted to position upper and lower matrix bands containing transparent master characters on an opaque background, with each matrix band being mounted on a set of sprocket teeth and overlying the associated row of apertures. Disposed within the drum are two flash lamps 28 and 30 for illuminating selective portions of the upper and lower matrix bands in a manner to be hereinafter explained. Also associated with the drum 10 is a photoelectric cell 31, a microscope 32, and a light source 33 adapted to count character identity slits in the lower matrix band.

Disposed in front of the drum 10 is a mask 35 having two windows aligned with the upper and lower matrix bands, the mask 35 being selectively horizontally moveable by means of a stepping motor 55, as can best be seen in FIG. 2, the motor 55 being operated from the control circuit. Directly in front of the mask 35 is a shutter 36 provided with two horizontally extending openings of suitable height to allow exposure of one row of characters located on the upper matrix band and one row of characters located on the lower matrix band. The shutter 36 is linked by an arm 37 to a collimating lens mechanism 38 so that the shutter will move in unison with the collimating lens. The collimating lens mechanism 38, and hence the shutter 36, may be vertically positioned at any one of four different levels through operation of a pair of binary solenoids 39 and 40.

Disposed between the shutter 36 and the collimating lens 38 is an optical merging means generally indicated by the reference numeral 60. The optical merging means comprises mirrors 62, 63 and 64 with a beam splitter 66. The optical merging means 60 is for the purpose of merging corresponding character rows, such as the top row in the upper matrix band and the top row in the lower matrix band, to a common optical axis. Light rays shining through the upper matrix band pass through the mask and shutter and are reflected by mirrors 62 and 63, and are directed onto the beam splitter 66, as indicated by the broken line arrows in FIG. 1. Light beams passing through the lower matrix band are reflected by the mirror 64 into the beam splitter 66. The optical merging means 60 functions in conjunction with the moveable shutter-collimating lens assemblage to provide selection of any one of four rows of characters on either the upper or lower matrix bands, as will be hereinbelow explained.

Immediately in front of the collimating lens 38 is one of seven magnifying lenses 42 which are mounted on a rotatable turret 44. Lens selection is accomplished by rotation of a turret motor, not shown, on command from a lens selection circuit. A travelling lens 46 and a reflecting mirror 48 are arranged on the optical axis of the magnifying lens 42 and are mounted on a carriage 50 which may be moved transversely by means of a rack 51, a gear 52, and a stepping motor 53. The light rays of the projected image are deflected by mirror 48 onto film 54. The film is arranged in a magazine and advanced by a stepping motor 56, motor operation being controlled by a control circuit.

The projection of characters can be best explained by reference to the schematic diagram of FIG. 2. A circular matrix band 80 is mounted on the drum 10, which is constantly revolving at a speed on the order of 30 revolutions per second. As the drum rotates, the characters on the matrix band sweep in front of flash lamp 28. Points 70, 71 and 72 represent positions of a given character as the matrix band is rotated, the reference numeral 70 representing the first position where the character may be projected. The reference numeral 71 represents an intermediate position, and the reference numeral 72 represents the last position where the character can be projected. The path of the light ray of the projected image can be traced by following the broken lines through the collimating lens 38, the magnifying lens 42, the travelling lens 46, and the mirror 48, and onto the film 54 in the positions labeled 70′, 71′ and 72′. The positions 70′, 71′ and 72′ depict where on the film 54 the image would be projected if the strobe light would be flashed when the master character on the matrix band is at each of the respective positions 70, 71 and 72. Thus, it can be seen that by variable flash timing, it is possible to project several characters spaced transversely on the film without movement of the travelling carriage 50.

The distance between the point 70 (where a given character may be first projected) and the point 72 (where the given character may be last projected) is such that unless the master characters are spaced substantially distant from each other on the matrix band, more than one character will be projected when the bulb is flashed. Accordingly, the windows of the mask 35 are of a width equal to the master character width so that only one complete character can be projected at a time, the adjacent characters being effectively shielded by the mask. Operation of the stepping motor 55 from the control circuit enables selective lateral movement of the mask to determine the position in which the selected character will be projected. Also shown in FIG. 2 are a pair of limit switches 57 and 58, the switches being actuated by the carriage 50 whenever it reaches either of its extreme positions to effect carriage movement reversal.

FIG. 3 of the drawing shows a portion of the matrix band 80, and is representative of each of the upper and lower matrix bands. The matrix band contains four rows of master characters, the rows being indicated by the symbols $R_1$, $R_2$, $R_3$ and $R_4$. Each row contains 90 master characters. In addition to the four rows of characters there is also a row of timing slits 86, for use when the band is utilized as a lower matrix band. The timing slits 86 provide reference points indicating the left-hand or leading edges of the master characters in each matrix column. The photoelectric cell 31 is provided to indicate the position of the leading edge of the master characters so that the characters will normally be printed with their leading edges in coincidence with a reference mark at the beginning of each space. However, the apparatus can be controlled to center any given master character in a space, if so desired.

Additional timing functions are provided by three sonic wheels, shown as wheels 74, 76 and 78 in FIG. 1, these wheels being used to generate timing pulses as the drum revolves. In the illustrated embodiment the sonic wheel 74 has one tooth, the wheel 76 has six teeth and the wheel 78 has twelve teeth. These teeth, when passing near associated pickups 75, 77 and 79, generate magnetic pulses which signal the control unit each time the drum rotates a given amount, thereby enabling constant determination of drum positioning. These sonic wheels may be easily replaced with wheels having different numbers of teeth, when it is desired to generate pulses of other frequencies.

Utilization of two matrix bands, each having four rows of master characters, thereby provides eight character rows. Selection of one of the eight rows for projection is accomplished in the following manner. The two high speed flash lamps 28 and 30 located within the drum 10, illuminate selective portions of the upper and lower matrix bands through the apertures in the periphery of the drum. Thus, by selectively flashing either one or the other of the lamps, the four rows of either the upper or lower matrix band may be illuminated. In order to select one of the four rows on each matrix band the shutter 36 is positioned so that its aperture is aligned with the desired row. As stated hereinabove the shutter 36 is connected by arm 37 to the collimating lens mechanism 38, this assemblage being selectively moveable to any one of four positions by control of the binary solenoids 39 and 40. Operation of the solenoid 39 selectively positions the shutter aperture proximate either the upper two rows or the lower two rows of the matrix band, operation of the solenoid 40 selectively aligning the shutter aperture with the uppermost or lowermost row. For example, if it is desired to illuminate a character on row $R_3$ of the matrix band 80, the solenoid 39 would be operated to position the shutter aperture proximate the lower two rows ($R_3$ and $R_4$) of the matrix band and the solenoid 40 would be operated to align the shutter aperture with row $R_3$ rather than row $R_4$. Thus, this mechanism, together with the beam merging means 60, allows the selection of any of the four rows of master characters on each of the upper or lower matrix bands for projection.

In ordinary typesetting applications the master characters of the matrix bands are alpha-numeric characters, each matrix row of characters providing a different and complete font of type. Thus, a selection of eight different type styles is available. When using this automatic phototypesetting apparatus in the present invention automated drafting system, only one or two matrix rows are utilized for alpha-numeric characters, these being used for the identifying nomenclature and headings of the schematic drawings. The remaining matrix rows are utilized for the various drawing symbols and portions of symbols. Thus, it is contemplated that large or complex symbols can be composed of a series of discrete symbol portions. For example, in the schematic drawing of FIG. 4 the symbol for an ammeter may be composed by sequentially projecting, in the same position, the circle symbol (appearing in the first column of row $R_1$ of the matrix band 80 shown in FIG. 3) and the "A" symbol (shown as appearing in the fourth column of row $R_4$ of the matrix band 80). Rotation of the lens turret 44 enables selection of the size of the symbols to be projected. Hence, when composing an ammeter symbol a magnifying lens would be selected to cast an enlarged image of the circle symbol, while the "A" symbol would be projected with lesser magnification at the same position so that it would fit properly within the circle symbol.

An alternate method for composing symbols from a series of discrete symbol portions is to project various portions of the symbol at different positions. In either of the hereinabove presented alternative methods of composing symbols from discrete symbol portions, the series of instructions necessary to operate the phototypesetting apparatus to compose the desired symbols can be stored in a computer memory, to thereby materially simplify the coding of a schematic diagram.

In accordance with the line-by-line composition technique of the above-described automatic phototypesetting apparatus, the locations of the various symbols, interconnecting lines and nomenclature comprising a desired schematic drawing are designated in terms of lines and spaces. Hence, the control circuit must function to select a desired character for projection and to determine the position of projection of the selected character by selecting a desired line and space. Projection of the desired character is achieved by selecting one of the flash lamps 28 and 30 (to determine whether projection is from a character on the upper or lower matrix band), by control of the shutter-collimating lens assemblage in accordance with operation of the solenoids 39 and 40 (to limit projection to a certain row on the selected matrix band), and by flashing the selected lamp at the instant when the desired character is in alignment with the window of mask 35 (to determine the particular character on the selected row). The position of the projected character on the film 54 is determined by controlled operation of the film advance stepping motor 56 (to select a line) and by controlled movement of the carriage 50 and mask 35 (to determine location on the selected line). Movement of the carriage 50 is controlled by operation of the carriage stepping motor 53 in conjunction with the limit switches 57 and 58, horizontal movement of the mask 35 being controlled by the mask stepping motor 55.

The control circuit provides the necessary electrical signals, in predetermined time relationship, to control operation of the various components of the automatic photo-typesetting apparatus. The necessary electrical signals are derived from a coded tape by reading the tape, a line at a time, into its storage and translating into electrical control signals in accordance with internal machine codes. The paper tape contains all of the drawing information, in proper order for line-by-line photo composition. For example, if it is desired to compose the simple circuit diagram shown in FIG. 4, the location of each character must be specified. The schematic diagram of FIG. 4 is a simple series circuit connection of a battery 87, a resistor labeled R43 and an ammeter 88. FIG. 5 of the drawing shows the circuit diagram of FIG. 4 labeled with line and space information which designate the positions of the various characters comprising the drawing. In the circuit of FIG. 5 the encircled numerals designate the lines and he numerals within he rectangles designate the spaces. More specifically, the battery 87 is specified as being on line 4, space 10, and the ammeter 88 is specified as being on line 4, space 25. The resistor nomenclature "R43" is specified as being above line 1, space 20, the resistance symbol being on line 1, space 20. The phototypesetting apparatus may be controlled with a sufficient degree of accuracy to specify a character as being on a line or in a fixed position above or below the line, as well as centered in a space or in a fixed position either to the right or to the left of the space.

In order to compose the circuit diagram of FIG. 4, with the characters being in the positions designated in FIG. 5, the tape would first instruct the phototypesetting apparatus to print the nomenclature "R43" above line 1, in space 20. Then line 1 would be composed by instructing the apparatus to print an upper-left corner symbol in space 10, horizontal line segments on spaces 11–19, a horizontally oriented resistance symbol on space 20, horizontal line segments on spaces 21–24, and an upper-right corner symbol on space 25. Suitable control signals would then follow to advance the film one line and return the carriage for the composition of line 2. In the illustrated example, line 2 composition would involve the printing of vertical line segments on spaces 10 and 25. It is readily apparent that to manually prepare a control tape for the composition of a relatively complex schematic drawing would be quite time consuming. Hence the present invention technique contemplates utilization of a digital computer, generally indicated by the reference numeral 105 in the block diagram of FIG. 7, to greatly simplify and reduce the manual effort necessary for preparation of the control tape for the automatic phototypesetting apparatus. In the illustrative example, this computer equipment is used to store composite symbols and commonly used nomenclature (readout being in response to a simple instruction), to rearrange data into correct order, and to store certain instructions associated with specific characters. An example of this latter function is the storage of a component symbol together with appropriate "line start" or "line stop" controls, whereby the computer will automatically provide the instructions for composing interconnecting lines. Such a degree of programming simplification is achieved that computer instructions can be formulated merely by reference to a simple free-hand sketch of the desired schematic drawing, the sketch being coded with line and space information as in FIG. 5. In the case of simpler schematic diagrams it is not even necessary to make a free-hand sketch.

Referring now to FIG. 6 of the drawing, there will be explained an illustrative technique for coding the diagram of FIG. 5 to control operation of the digital computer equipment which prepares the control tape for the automatic phototypesetting apparatus. The computer instruction code is quite simple, so little personnel training is necessary. It has been hereinabove explained that line information is represented by encircled numerals, and space information by numerals appearing in rectangles. These designations are utilized in the code of FIG. 6. Other code symbols are utilized to distinguish between nomenclature and symbology, to identify the various symbols, to provide a carriage return code and various supplementary instructions.

Remembering that the automatic phototypesetting apparatus composes in line-by-line fashion, the computer instruction code is most conveniently prepared by working downward from the top of the desired schematic drawing. Hence, the first instruction to be coded for the circuit of FIG. 5 is for the nomenclature "R43" appearing above the resistor symbol on line 1, space 20. This particular instruction is coded in FIG. 6 as follows: the location (above line 1, centered on space 20) is first written down, the encircled numeral 1 representing the line, the $u$ indicating that printing will be above the line, the rectangularly encased numeral 20 indicating space 20, the $c$ indicating that following nomenclature is to be centered on space 20. Then, the nomenclature "R43" is entered, followed by a carriage return instruction in the form of an encircled "R."

On line 1 of the drawing of FIG. 5 a horizontal line extends from an upper-left corner on space 10 to a horizontally oriented resistor symbol on space 20, the resistor symbol being followed by another horizontal line extending to an upper-right corner on space 25. This information is coded by the second row of instructions appearing in FIG. 6, as follows: the first entry is an encircled numeral 1 to identify the line, followed by the symbol "Λ" which indicates that symbology will follow, this symbol being hereinafter referred to as the "symbology identifier." This latter symbol is necessary to distinguish between nomenclature instructions and symbology instructions wherein the instructions are themselves coded in terms of nomenclature. The first symbol appearing on line 1 is an upper-left corner symbol (see the fourth column of row $R_1$ of the matrix band 80 shown in FIG. 3), this symbol being identified by the code notation "$c1$." Four different corner symbols are provided on the matrix band 80 shown in FIG. 3 (see the fourth and fifth columns of rows $R_1$ and $R_2$), the lower-left corner symbol being coded as "$c2$," the upper-right corner symbol as "$c3$," and the lower-right corner symbol as "$c4$."

Since corner symbols are usually connected to horizontal and vertical line segments, appropriate line start controls are stored in the computer memory in conjunction with the instructions for symbols which are connected by lines. For example, the upper-left corner symbol is stored in the computer memory together with horizontal and vertical line start controls for readout in response to the input code $c1$. Thus, when the input code $c1$ is fed into the computer, the computer will produce an output which will instruct the automatic phototypesetting apparatus to compose an upper-left corner symbol followed by a horizontal line, and also including a vertical line, these lines extending until they contact other characters in the drawing. A horizontal line is composed by printing the horizontal line segment symbol appearing in the seventh column of row $R_1$ of the matrix band 80 in succeeding spaces on the same line of composition. Thus, the line start instruction provided by the computer directs the automatic phototypesetting apparatus to print a series of horizontal line segment symbols in adjacent spaces until reaching a space occupied by another character, whereupon the line is automatically stopped.

Note that an upper-right corner symbol will terminate a horizontal line and begin a vertical line, so only a vertical start instruction is stored together with the upper-right corner symbol for readout in response to the input code $c3$, the corner symbol itself serving to halt the printing of the series of line segments composing the horizontal line which terminates at this corner. The vertical line segment symbol is found in the sixth column of row $R_1$ of the matrix band 80.

The upper-right corner symbol is coded in the second row of FIG. 6 by first entering the symbology identifier (indicating that symbology follows) and then the rectangularly encased numeral 25 (indicating space 25) and the control code $c3$ (indicating the upper-right corner symbol).

The code instruction "RH" is used to identify a horizontally aligned resistor symbol. This symbol is stored in the computer memory in conjunction with a horizontal line start instruction following the symbol. To cause printing this symbol in the appropriate space in line 1 of the drawing of FIG. 5, there is first inserted into the coding of FIG. 6 the symbology identifier (indicating that symbology follows) followed by a rectangularly encased numeral 20 (indicating space 20), the RH (indicating a horizontally aligned resistor), followed by an encircled R (indicating a carriage return).

Since the digital computer equipment stored data and rearranges it into proper form, it is not necessary to enter the line 1 information in the exact order that the symbols are to appear on the finished schematic diagram. In this regard, note that in the exemplary coding shown in FIG. 6 the corner symbol instructions on line 1 were entered first, followed by the resistor symbol instructions. Referring again specifically to the second row of the coding of FIG. 6, the simplified data code, when fed into the digital computer apparatus, is expanded and rearranged in proper form to produce an output which contains the following instructions in the following order to instruct the automatic phototypesetting apparatus to compose line 1 of the schematic drawing of FIG. 5: an upper-left corner symbol on space 10, horizontal and vertical line start instructions from space 10, a horizontal resistor symbol on space 20 (this symbol automatically stopping the horizontal line extending from space 10), a horizontal line start symbol, and an upper-right corner symbol on space 25 (this symbol automatically stopping the horizontal line extending from the resistor), a vertical line start instruction, and a carriage return.

The third row of coding in FIG. 6 pertains to the printing of the + sign appearing above and to the right of space 10 on line 4. This coding reads: line 4 symbology follows, above space 10 and to the right, print a +, carriage return. In a similar manner it is readily apparent that the sixth row of coding in FIG. 6 instructs the printing of a — sign below and to the right of space 10, line 4, the "1" indicating that printing is to occur below the line.

Referring to that portion of the matrix band 80 shown in FIG. 3, it is apparent that the ammeter symbol centered on line 4, space 25 of the circuit of FIG. 5 can be composed by exposing, at the same position on the film, an enlargement of the circle symbol appearing in the first column of matrix row $R_1$ and the "A" symbol appearing in the fourth column of matrix row $R_4$. The vertically aligned battery symbol centered on line 4, space 10 can be found as the unitary symbol appearing in the third column of matrix row $R_2$. Instructions for coding the battery and ammeter symbols in the circuit of FIG. 5 comprise rows 4 and 5 of the coding of FIG. 6. The fourth coding row specifies that the symbol "A" is to be printed on the middle of line 4 and centered on space 25. The coding instructions appearing on the fifth row reads as follows: on line 4 a vertically oriented battery symbol is to be printed on space 10 (the battery symbol being coded as "BA"), and centered on space 25 there is to be an enlarged circle together with a downwardly extending vertical line start instruction ("B" indicating the selection of the proper lens to provide the proper size circle "C," the "VB" indicating a vertical line starting below the circle). The vertical battery symbol is stored in the computer together with a vertical line start symbol to begin a vertical line extending downwardly from the battery. Since circles are used for many purposes and may or may not have a vertical line extending directly below it, such as when used as a part of a composite transistor symbol, for example, a vertical line start instruction is not stored in conjunction with the circle symbol and it is necessary to include a vertical line start symbol in the input coding in this instance.

From the foregoing discussion, the coding for line 7 of the schematic drawing of FIG. 5 becomes readily apparent, it being necessary merely to specify the lower-left and lower-right corner symbols c2 and c4, the lower-left corner symbol c2 being stored in the computer memory together with a horizontal line start instruction. Thus, the computer will instruct the automatic phototypesetting apparatus to print a horizontal line extending from the lower-left corner symbol until halted by the lower-right corner symbol on space 25. The preceding coding technique is intended as being exemplary only, and other coding schemes and types of computer information storage will become readily apparent to those skilled in the art.

Upon composing the coding of FIG. 6, a first control tape is prepared by typing the coding on the keyboard of a keyboard tape puncher, generally indicated by the reference numeral 106 in the block diagram of FIG. 7. It is presently preferred to utilize a keyboard tape puncher of the type commonly known as "Flexowriter," produced by the Friden Company, this apparatus being similar to a typewriter that can simultaneously produce typewritten text and a corresponding perforated tape. The keyboard tape puncher 106 produces a first coded control tape containing the basic drawing information, such as that coded in FIG. 6.

Referring to the system block diagram of FIG. 7, this first coded tape is fed into a tape reader 102 associated with the digital computer 105, the digital computer expanding and rearranging the data as hereinabove explained, the computer output being fed to a tape perforator 104 to produce a second coded control tape containing all of the data necessary for controlling the automatic phototypesetting apparatus to compose the desired schematic drawing. For the digital computer 105 it is presently preferred to utilize a small, special purpose computer, such as that commonly known as the "230B-Comp/Set," produced by the Bunker-Ramo Corporation, this computer having been developed for application by the graphic-arts industry to be utilized for the high speed composition of printed type. Suitable tape readers 102 and tape perforators 104 are readily commercially available from Royal McBee Company.

A high speed tape reader 107 is provided for the automatic phototypesetting apparatus, the tape reader being incorporated in the aforementioned presently preferred embodiment of automatic phototypesetting equipment. The second coded control tape, containing all of the necessary data, arranged in the proper order, is fed into the tape reader 107 which controls operation of the automatic phototypesetting apparatus to compose the desired schematic drawing.

The manual effort required in connection with the preparation of a schematic drawing using the present invention sytem is limited to the typing of a simplified drawing code to prepare a first tape, feeding this first tape into the tape reader 102, and taking the second tape from the tape perforator 104 and feeding it into the tape reader 107. In order to make drawing revisions it is merely necessary to correct the original drawing code and prepare a new tape. For example, if it is desired to substitute a capacitor symbol for the resistor symbol shown in FIG. 5, it would merely be necessary to change the symbol designation code in the second row of coding of FIG. 6, remembering that the interconnecting line portions of the drawing will be automatically stopped and started by the computer. The capacitor symbol could be coded into the FIG. 5 circuit to replace the resistor there shown on line 1 by deleting the resistor coding instruction shown in FIG. 6 and substituting the following after the third symbol identifier in row 2: a rectangularly encased numeral 20 (indicating that the symbol is to be centered on space 20), the appropriate capacitor symbol instruction, followed by an encircled R (indicating carriage return).

Thus, there has been described an automated drafting system for preparing schematic drawings without the necessity of manual drafting, and in which drawing revisions can be easily made. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. Furthermore, although the presently preferred embodiment was explained with reference to the preparation of an electrical circuit schematic drawing, it is emphasized that the present invention system may be used to prepare any type of schematic drawing, utilizing any combination of symbols, straight lines, and nomenclature, it being only necessary to provide matrix bands having the proper master characters and to store the proper data and control coding in the computer memory.

What is claimed is:

1. A drafting process for preparing a schematic drawing, comprising the steps of:
   (a) converting information identifying and locating the symbols, nomenclature and ends of interconnecting lines of a desired schematic drawing into primary data in accordance with a predetermined code;
   (b) converting information identifying and locating interconnecting lines of the desired schematic drawing into supplementary data in accordance with said predetermined code;
   (c) combining by computer means said supplementary data with said primary data generating a control media wherein the data representing interconnecting lines are properly located between the data representing the respective ends of the interconnecting lines; and, (d) controlling by reader means the operation of phototypesetting means for reproducing said symbols, nomenclature, ends of interconnecting lines and interconnecting lines in accordance with said control media; whereby said phototypesetting means produces a schematic drawing representative of said converted information.

2. The process defined in claim 1, wherein location in said predetermined code is determined with reference to a coordinate system, and wherein said primary data representing a predetermined symbol is composed of a series of datum representing the configuration and positioning of discrete parts of said certain symbol.

3. An automated system for preparing a schematic drawing, comprising:

(a) automatic phototypesetting apparatus including means for projecting images of selected characters in selected positions in response to coded input signals applied to a control circuit in accordance with a predetermined code, said means for projecting images further including a character matrix with a plurality of master characters comprising the symbols and characters of a desired schematic drawing; and, (b) computer means for converting information identifying and locating the symbols and nomenclature comprising the desired schematic drawing into data, synthesizing the data to produce coded signals in said predetermined code in proper form and sequence for selecting the master characters of said matrix and their respective positions of projection in accordance with the symbols and characters of the desired schematic drawing and their respective positions on said drawing, and applying the coded signals to the input of said control circuit to operate said phototypesetting apparatus to compose the desired schematic drawing.

4. An automated system for preparing a schematic drawing, comprising:

(a) automatic phototypesetting apparatus including means for projecting images of selected characters in selected positions in response to input signals applied to a control circuit by a record coded in accordance with a predetermined code, said means for projecting images further including a character matrix with a plurality of master characters comprising the symbols and characters of a desired schematic drawing;

(b) means for coding information identifying and locating the symbols, nomenclature and ends of interconnecting lines of the desired schematic drawing into primary data in accordance with said predetermined code to produce a first code record;

(c) computer means for combining the data on said first code record with internally generated data identifying and locating interconnecting lines of the desired schematic drawing in accordance with said predetermined code, and synthesizing the combined data to produce a second code record containing signals in said predetermined code in proper form and sequence for selecting the master characters of said matrix and their respective positions of projection in accordance with the symbols and characters of the desired schematic drawing and their respective positions on said drawing; and, (d) means for reading said second code record into the input of said control circuit to operate said phototypesetting apparatus to compose the desired schematic drawing.

5. The automated drafting system defined in claim 3, wherein the input of said computer means includes first tape record reading means and the output of said computer is provided with tape record preparing means, and wherein the input of said automatic phototypesetting means is provided with second tape record reading means, and wherein the information identifying and locating the symbols and nomenclature comprising the desired schematic drawing is contained on a first tape record fed to said first tape record reading means, said computer producing a second tape record coded in said predetermined code, said second tape record being fed to said second tape record reading means to control operation of said phototypesetting apparatus to compose the desired schematic drawing.

6. The automated drafting system defined in claim 5, further concluding a keyboard operated tape perforating means for preparing said first tape record.

References Cited

UNITED STATES PATENTS 3,328,655   6/1967   Tripp _____ 235—151.11

NORTON ANSHER, Primary Examiner

W. A. SIVERTSON, Assistant Examiner